United States Patent
Estroff et al.

(10) Patent No.: US 8,166,540 B2
(45) Date of Patent: Apr. 24, 2012

(54) HARDWARE PASSWORD ALIGNMENT SYSTEM APPARATUS AND METHODS

(75) Inventors: Jeffrey Mark Estroff, Cary, NC (US); Seiichi Kawano, Kanagawa (JP); Mikio Hagiwara, Yamato (JP); Keiko Kokubun, Yokohama (JP)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 782 days.

(21) Appl. No.: 12/034,805

(22) Filed: Feb. 21, 2008

(65) Prior Publication Data

US 2009/0217389 A1     Aug. 27, 2009

(51) Int. Cl.
 *G06F 21/00* (2006.01)
(52) U.S. Cl. ............................ 726/18; 713/1
(58) Field of Classification Search .................. 726/18; 713/1
See application file for complete search history.

(56) References Cited

U.S. PATENT DOCUMENTS

| | | | |
|---|---|---|---|
| 5,475,762 A | 12/1995 | Morisawa et al. | |
| 6,456,277 B1 | 9/2002 | Satoh et al. | |
| 2002/0054120 A1* | 5/2002 | Kawano et al. | 345/773 |
| 2002/0177428 A1* | 11/2002 | Menard et al. | 455/404 |
| 2004/0210692 A1 | 10/2004 | Rothman et al. | |
| 2005/0102432 A1 | 5/2005 | Winslow | |
| 2005/0222933 A1* | 10/2005 | Wesby | 705/36 |
| 2008/0177920 A1* | 7/2008 | Dennis | 710/200 |

OTHER PUBLICATIONS

Kaplan et al, "Unicode and Keyboards on Windows", Mar. 2003, 23rd Internationalization and Unicode Conference, Prague, Czech Republic.*

* cited by examiner

*Primary Examiner* — Kambiz Zand
*Assistant Examiner* — Michael Guirguis
(74) *Attorney, Agent, or Firm* — Kunzler Needham Massey & Thorpe

(57) ABSTRACT

A system, apparatus, and methods are disclosed for aligning a stored scancode sequence that corresponds to a hardware password, with a password input device type such as a current keyboard type. Aligning the stored scancode sequence with the password input device type enables successful validation of a hardware password despite a change in a password input device type or inadvertent corruption of a non-volatile memory used for storing the scancode sequence such as non-volatile memory that stores BIOS information for a computing device.

20 Claims, 4 Drawing Sheets

HARDWARE PASSWORD ALIGNMENT SYSTEM APPARATUS AND METHODS

FIELD OF THE INVENTION

The invention relates generally to hardware passwords and specifically to systems, apparatus, and methods for aligning stored scancode sequences for hardware passwords with a current keyboard type.

DESCRIPTION OF THE RELATED ART

Hardware passwords such as power-on passwords, supervisor passwords, and hard-drive passwords are often stored as keyboard scancode sequences within non-volatile memory. Unfortunately, the user may voluntarily or involuntarily switch their keyboard to a different keyboard type resulting in a mismatch between the stored scancode sequences and the keyboard. In other instances, a scancode sequence stored within the non-volatile memory may be corrupted. In either situation, a user may be unable to access the hardware despite providing a legitimate password in response to a hardware password request.

SUMMARY OF THE INVENTION

The present invention has been developed in response to the present state of the art, and in particular, in response to the problems and needs in the art that have not yet been fully solved by currently available hardware password systems, apparatus, and methods. Accordingly, the present invention has been developed to provide systems, apparatus, and methods to align scancode sequences with hardware passwords that overcome many or all of the above-discussed shortcomings in the art.

One apparatus disclosed herein includes, in certain embodiments, a non-volatile memory that stores a stored scancode sequence, a password verification module, and a scancode update module. The password verification module may use the stored scancode sequence to validate a hardware password provided by a user. The scancode update module may provide a current keyboard type for a hardware device to a password server, receive a scancode sequence for the keyboard type from the password server that corresponds to a password, and change the stored scancode sequence to the scancode sequence provided by the password server.

One system disclosed herein includes, in certain embodiments, a hardware device that provides access to resources on the hardware device in response to a user providing a hardware password, and a password server that stores the hardware password for the hardware device, receives a current keyboard type for the hardware device, and provides a scancode sequence for the keyboard type to the hardware device that corresponds to the hardware password. The hardware device may receive the scancode sequence for the keyboard type and change a stored scancode sequence on the hardware device to the scancode sequence provided by the password server.

One method disclosed herein includes, in certain embodiments, providing a current keyboard type for a hardware device to a password server, receiving a scancode sequence for the keyboard type from the password server, changing a stored scancode sequence corresponding to a hardware password for the hardware device to the scancode sequence provided by the password server.

Another method disclosed herein includes, in certain embodiments, receiving a keyboard type for a hardware device, generating a scancode sequence for the keyboard type from a hardware password corresponding to the hardware device, and providing the scancode sequence to the hardware device.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
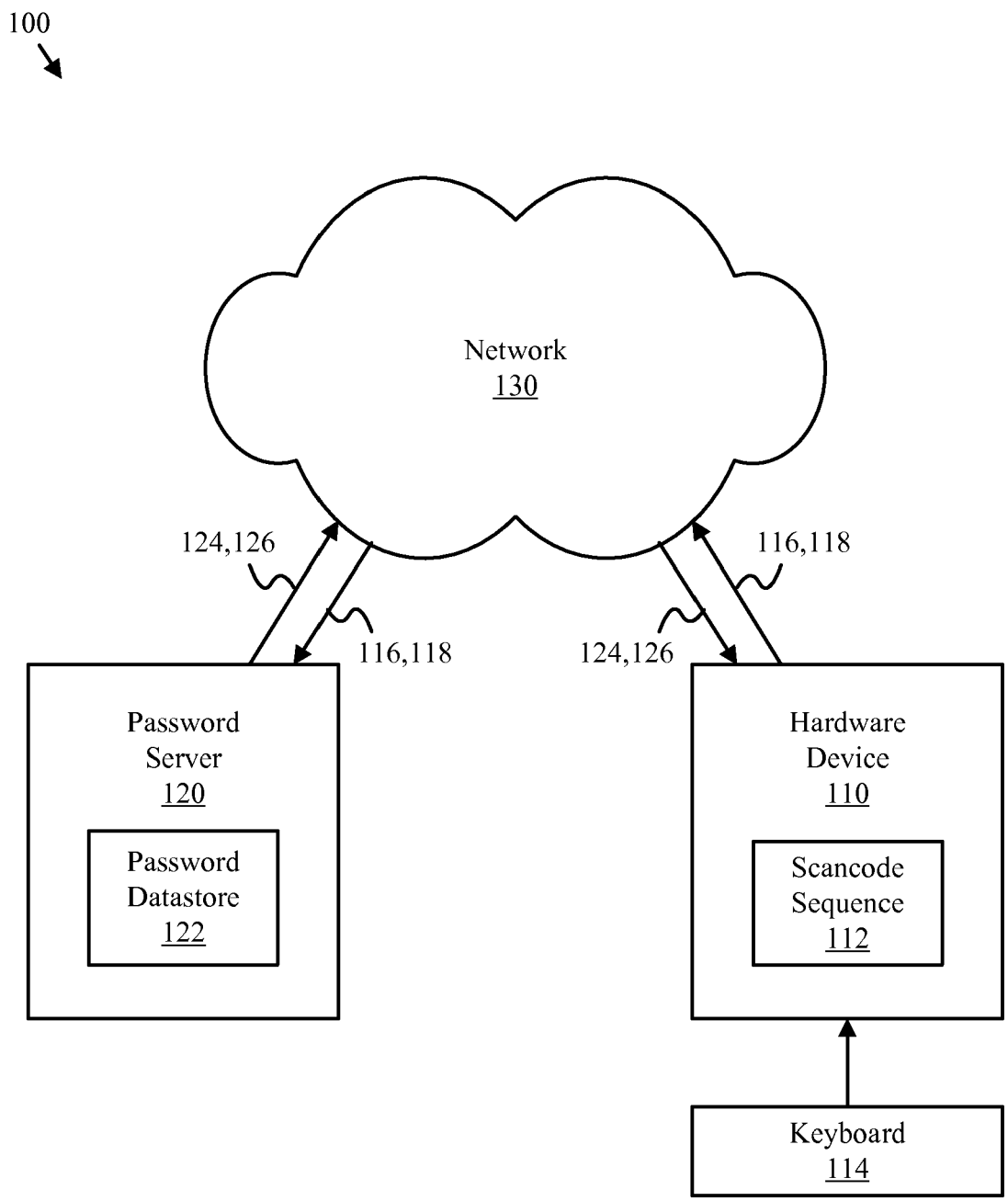
FIG. 1 is a schematic block diagram that is consistent with at least one embodiment of a password alignment system disclosed herein.

Some of the functional units described in this specification have been labeled as modules (while others are assumed to be modules), in order to emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, solid state memory, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

These features and advantages will become more fully apparent from the following description and appended claims, or may be learned by the practice of the invention as set forth hereinafter.

FIG. 1 is a schematic block diagram of a password alignment system 100. As depicted, the password alignment system 100 includes a hardware device 110, a password server 120, and a computing network 130. The password alignment system 100 enables a hardware device to validate a hardware password despite a change to a different type of password input device 114.

As mentioned in the background section, a hardware device such as the hardware device 110 often stores a password scancode sequence that is used to validate a hardware password that is required to access resources associated with the hardware device. For example, the hardware password may be validated by a BIOS resident routine during a boot procedure or the like. The BIOS resident routine may have limited resources that prohibit input mapping functionality common to operating systems. As a result, the BIOS resident routine may be required to conduct a direct comparison of the input symbols provided by the password input device 114 with a stored scancode sequence 112 when validating a hardware password. In prior art solutions, a change to a different type of password input device 114 could prevent a user from accessing the resources associated with the hardware device.

In contrast, in many of the solutions disclosed herein, the hardware device 110 may detect the current type of password input device 114 and provide the password server 120 with a current input device type indicator 116. In the depicted embodiment, the input device type indicator 116 is a keyboard type indicator. The input device type indicator 116 may be provided to the password server 120 within a scancode sequence update request 118 or the like.

The password server 120 may store a hardware password (not shown) for the hardware device 110 within a password datastore 122 or the like. In response to the scancode sequence update request 118, the password server 120 may convert the stored hardware password to a scancode sequence 124 that corresponds to current password input device type as indicated by indicator 116. The scancode sequence 124 may be provided to the hardware device 110 via a scancode sequence update message 126 or the like.

The hardware device 110 may receive the scancode sequence 124 and change the stored scancode sequence 112. The resulting change to the stored scancode sequence 112 enables the hardware device 110 to validate a hardware password despite a change to a different type of password input device 114.

Figure 2:
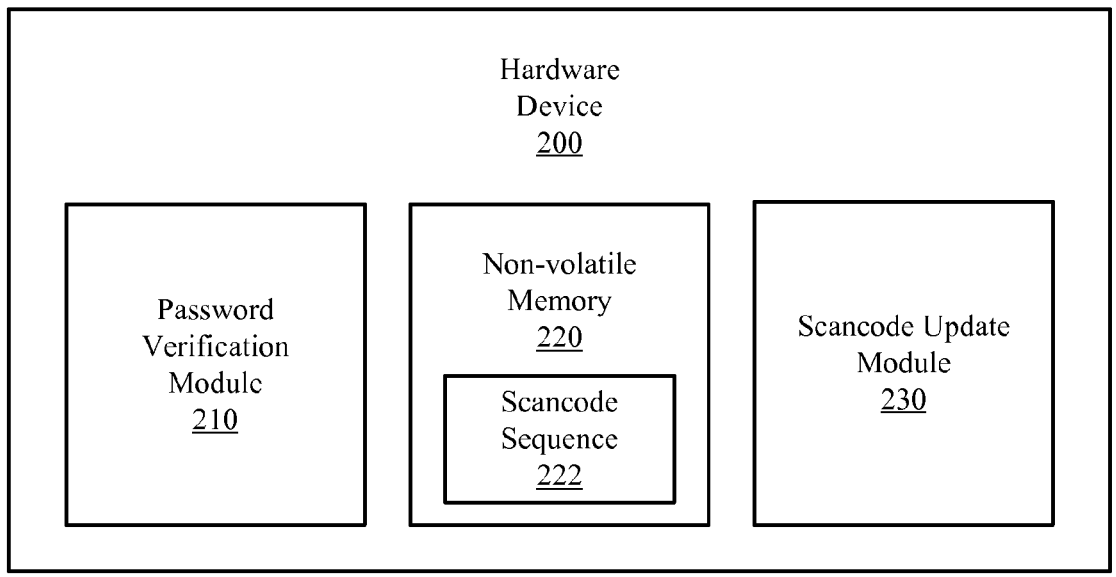
FIG. 2 is a schematic block diagram that is consistent with at least one embodiment of a hardware device disclosed herein.

FIG. 2 is a schematic block diagram of a hardware device 200. As depicted, the hardware device 200 includes a password verification module 210 a non-volatile memory 220, and a scancode update module 230. The hardware device 200 is one example of the hardware device 110 depicted in FIG. 1.

The password verification module 210 may prompt a user for a hardware password such as a power-on password, a supervisor password, or a hard drive password. The password verification module may receive the hardware password from the user as an input scancode sequence that may be dependent on the input device type used to enter the hardware password. The password verification module 210 may compare the input scancode sequence to the stored scancode sequence 222 and determine if they match. In one embodiment, the input from the user is provided via a keyboard.

If the input scancode sequence matches the stored scancode sequence 222, the password verification module 210 may grant access to resources associated with the hardware device 200 such as the system BIOS or attached hard drives. One of skill in the art will appreciate that the password verification module 210 could be is embodied in a variety of forms such as those describe above regarding modules. For example, the password verification module 210 could be embodied either partially or wholly as a BIOS resident routine.

The non-volatile memory 220 maintains the scancode sequence 222 across power cycling operations, shutdown operations, and the like. In one embodiment, the non-volatile memory power comprises FLASH memory. Other examples include read-only memory and most types of magnetic computer storage devices (e.g. hard disks, floppy disk drives, and magnetic tape), and optical disc drives. In some embodiments, the non-volatile memory stores BIOS related information including the scancode sequence 222. In certain embodiments, the scancode sequence 222 is copied into working memory from the non-volatile memory 220 to facilitate validation.

The scancode update module 230 may communicate with a password server such as the password server 120 depicted in FIG. 1 in order to ensure alignment between the scancode sequence 222 and the current device type. In some embodiments, the current device type is a keyboard type that is determined by having the user enter a certain symbol or letter such as the letter 'z'. The scancode update module may prompt the user for the letter 'z' or a similar symbol and align the scancode sequence 222 with the current device type. Alignment may occur in response to a variety of events such as a change in the current device type, a plurality of unsuccessful password verification attempts, or a user request to update the stored scancode sequence.

The schematic flow chart diagrams that follow are generally set forth as a logical flow chart diagrams. As such, the depicted order and labeled steps are indicative of one embodiment of the presented methods. Other steps and methods may be conceived that are equivalent in function, logic, or effect to one or more steps, or portions thereof, of the illustrated methods. Additionally, the format and symbols employed are provided to explain the logical steps of the methods and are understood not to limit the scope of the methods. Although various arrow types and line types may be employed in the flow chart diagrams, they are understood not to limit the scope of the corresponding methods. Indeed, some arrows or other connectors may be used to indicate only the logical flow of the methods. For instance, an arrow may indicate a waiting or monitoring period of unspecified duration between enumerated steps of the depicted methods. Additionally, the order in which a particular method occurs may or may not strictly adhere to the order of the corresponding steps shown.

Figure 3:
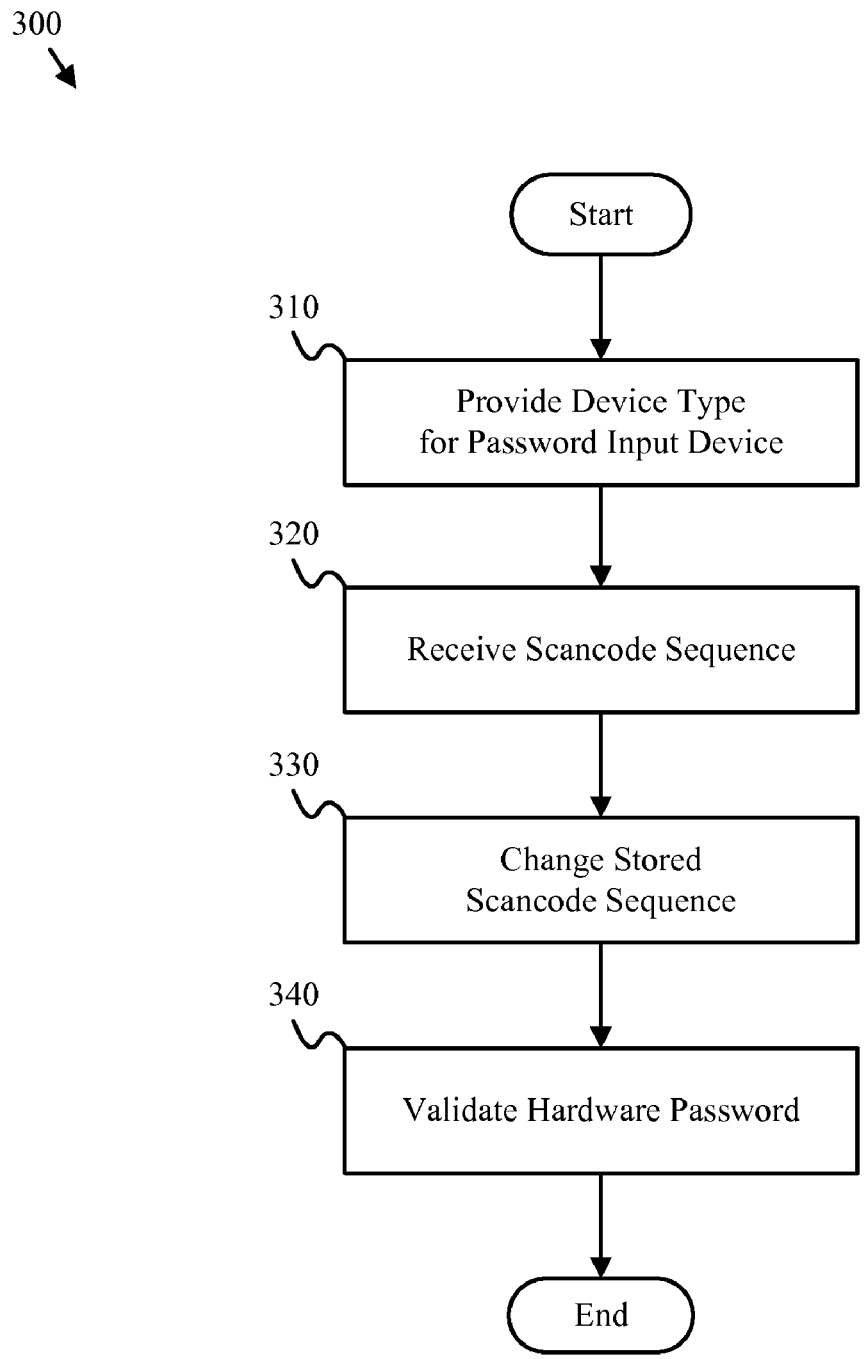
FIG. 3 is a flowchart diagram that is consistent with at least one embodiment of a password alignment method disclosed herein from the perspective of a hardware device.

FIG. 3 is a flowchart diagram depicting one embodiment of a password alignment method 300. As depicted, the password alignment method 300 includes providing 310 a device type, receiving 320 a scancode sequence, changing 330 a stored scancode sequence, and validating 340 a hardware password. The method 300 is depicted from the perspective of a hardware device such as the hardware device 110.

Figure 4:
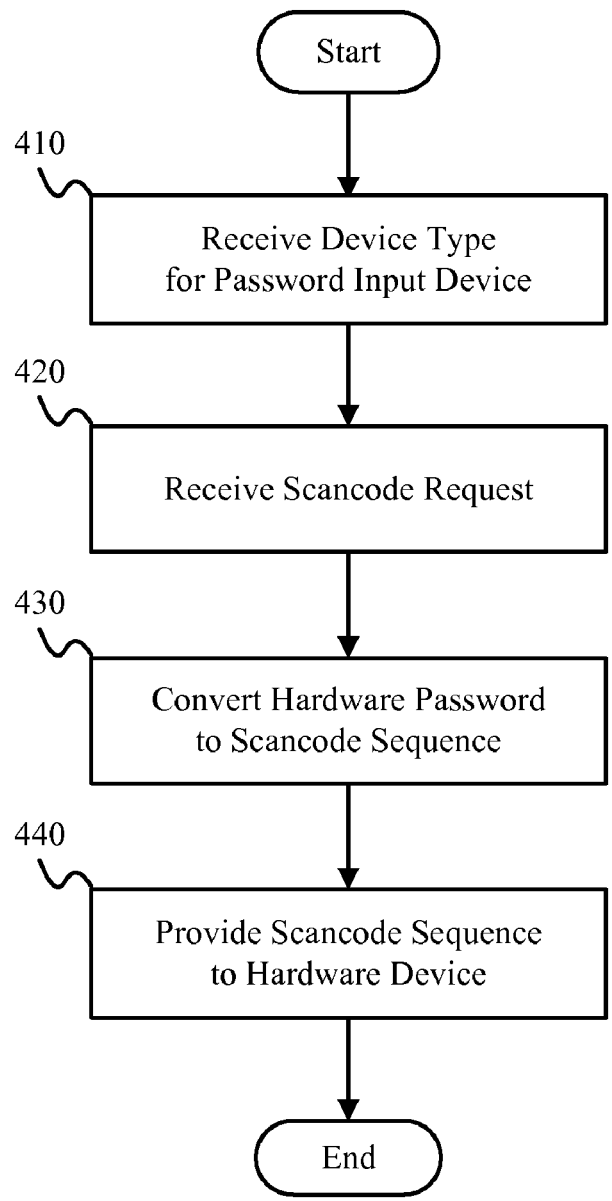
FIG. 4 is a flowchart diagram that is consistent with at least one embodiment of a password alignment method disclosed herein from the perspective of a password server.

Similar to FIG. 3, FIG. 4 is a flowchart diagram depicting one embodiment of a password alignment method 400. As depicted, the password alignment method 400 includes receiving 410 a device type, receiving 420 a scancode request, converting 430 a hardware password to a scancode sequence, and providing 440 the scancode sequence to a hardware device. The method 400 is depicted from the perspective of a password server such as the password server 120. The methods 300 and 400 may facilitate interaction between a hardware device and a password server that aligns a stored scancode sequence with a current device type.

Providing 310 a device type may include transmitting the device type to a password server which may receive 410 the device type. The device type may be a device type for a password input device. In one embodiment, the password server receives 410 the device type in conjunction with receiving 420 a scancode request that includes the device type.

In response to receiving 420 the scancode request, the password server may convert 430 a hardware password archived thereon to a scancode sequence corresponding to the device type. Examples of a hardware password include a power-on password, a supervisor password, and a hard drive password. One of skill in the art will appreciate that the password server may have received the hardware password archived thereon through a variety of methods. For example, the password server may have received the hardware password through a secure network channel negotiated between the client and the server.

In response to converting 430 the hardware password archived thereon to a scancode sequence, the password server may provide 440 the scancode sequence to the hardware device. In turn the hardware device may receive 320 the scancode sequence, and change 330 the stored scancode sequence thus aligning the stored scancode sequence with the current keyboard type. Subsequently, the hardware device may validate 340 a hardware password provided by the user.

The depicted methods 300 and 400 illustrate particular examples of aligning a scancode sequence with a password input device type. For example, a hardware device may successfully validate a user during a reboot procedure despite a change in a keyboard type previous to the reboot procedure. Similarly, the depicted password alignment system 100 and hardware device 200 illustrate particular examples of means for aligning a scancode sequence with a device type. One of skill in the art will appreciate that a variety of variations may be deployed that maintain the spirit and intent of the means and methods communicated herein while remaining within the scope of the claims included herewith.

What is claimed is:

1. An apparatus comprising:
   a non-volatile memory configured to store a stored scancode sequence;
   a password verification module configured to prompt a user for a hardware password for a hardware device, receive an input scancode sequence from a keyboard, compare the input scancode sequence to the stored scancode sequence according to a Basic Input/Output System ("BIOS") resident routine and provide access to hardware resources if the input scancode sequence matches the stored scancode sequence, wherein the hardware password is a BIOS controlled password for validation by the BIOS resident routine; and
   a scancode update module configured to provide a current keyboard type for the hardware device to a password server, receive a scancode sequence corresponding to the current keyboard type, the scancode sequence comprising a scancode representation of a password from the password server, and change the stored scancode sequence to the scancode sequence provided by the password server.

2. The apparatus of claim 1, wherein the hardware password is a BIOS controlled password.

3. The apparatus of claim 1, wherein the hardware password is selected from a group consisting of a power-on password, a supervisor password, and a hard-drive password.

4. The apparatus of claim 1, wherein the scancode update module is further configured to update the stored scancode sequence in response to detecting a change in the current keyboard type by the client.

5. The apparatus of claim 1, wherein the scancode update module is further configured to update the stored scancode sequence in response to a plurality of unsuccessful password verification attempts.

6. The apparatus of claim 1, wherein the scancode update module is further configured to update the stored scancode sequence in response to a user request to update the stored scancode sequence.

7. A system comprising:
   a hardware device configured to provide access to resources on the hardware device in response to a user providing a hardware password and the hardware device validating the hardware password according to a Basic Input/Output System ("BIOS") resident routine comparing an input scancode sequence to a stored scancode sequence, the hardware password being a BIOS controlled password;
   a password server configured to store the hardware password for the hardware device, receive a current keyboard type for the hardware device, and provide a scancode sequence corresponding to the keyboard type, the scancode sequence comprising a scancode representation of the hardware password; and
   the hardware device further configured to receive the scancode sequence for the keyboard type and change a stored scancode sequence on the hardware device to the scancode sequence provided by the password server.

8. The system of claim 7, wherein the hardware password is a BIOS controlled password.

9. The system of claim 7, wherein the hardware password is selected from the group consisting of a power-on password, a supervisor password, and a hard-drive password.

10. The system of claim 7, wherein hardware device is further configured to request the scancode sequence in response to detecting a change in the current keyboard type.

11. The system of claim 7, wherein hardware device is further configured to request the scancode sequence in response to a plurality of unsuccessful password verification attempts.

12. The system of claim 7, wherein hardware device is further configured to request the scancode sequence in response to a user request to update the stored scancode sequence.

13. A method comprising:
   detecting an alignment event;

providing a current keyboard type for a hardware device to a password server in response to detecting an alignment event, the hardware device configured to validate a hardware password according to a Basic Input/Output System ("BIOS") resident routine that compares an input scancode sequence to a stored scancode sequence, the hardware password being a BIOS controlled password;

receiving, at the hardware device, a scancode sequence corresponding to the keyboard type from the password server, the scancode sequence comprising a scancode representation of a password from the password server; and changing a stored scancode sequence corresponding to hardware password for the hardware device to the scancode sequence provided by the password server.

14. The method of claim 13, further comprising validating a user-provided password using the stored scancode sequence.

15. The method of claim 13, wherein the hardware password is a BIOS controlled password.

16. The method of claim 13, wherein the hardware password is selected from the group consisting of a power-on password, a supervisor password, and a hard-drive password.

17. The method of claim 13, wherein providing, receiving, and changing occurs in response to detecting a change in the current keyboard type.

18. The method of claim 13, wherein providing, receiving, and changing occurs in response to a plurality of unsuccessful password verification attempts.

19. The method of claim 13, wherein providing, receiving, and changing occurs in response to a user request to update the stored scancode sequence.

20. A method comprising:

receiving, at a password server, a keyboard type for a hardware device from the hardware device, the hardware device configured to validate a hardware password according to a Basic Input/Output System ("BIOS") resident routine that compares an input scancode sequence to a stored scancode sequence, the hardware password being a BIOS controlled password;

converting the hardware password corresponding to the hardware device to a scancode sequence for the keyboard type, the scancode sequence comprising a scancode representation of the hardware password; and providing the scancode sequence to the hardware device.

* * * * *